FILING SYSTEM INDEX INDICATORS AND METHOD OF PRODUCING SAME

Filed June 6, 1966 2 Sheets-Sheet 1

INVENTOR.
D. T. BARBER
BY T. C. SCRYMGEOUR
Douglas S. Johnson
Attorney

INVENTOR.

BY D.T. BARBER
T. C. SCRYMGEOUR

Douglas S. Johnson
Attorney

United States Patent Office 3,504,907
Patented Apr. 7, 1970

3,504,907

FILING SYSTEM INDEX INDICATORS AND METHOD OF PRODUCING SAME

Donald Treadgold Barber, 38 Servington Crescent, Toronto, Ontario, Canada, and Thomas Charles Scrymgeour, 58 Holford Crescent, Agincourt, Ontario, Canada Filed June 6, 1966, Ser. No. 555,310
Int. Cl. B41f *13/54;* B65h *39/02*
U.S. Cl. 270—1 9 Claims

ABSTRACT OF THE DISCLOSURE

A method of preparing filing system index indicators where each indicator has printed thereon any one of several indicia in a plurality of fields. The sheets on which the indicators are printed are pre-marked with marks representative of the indicia to be printed in each one of the fields, and are sorted with respect to the pre-marked marks with all sorting for all indicia in any one field being done before any sorting is done for any indicia in another field. The method is particularly adaptible for printing discontinuous series of numbers.

This invention relates to filing system index indicators. In particular, the invention relates to colour coded index indicators for use in filing systems, and a method of preparing them.

It is an object of this invention to provide colour coded index indicators which considerably lessen the chances of misfiling documents, and which are particularly useful in filing systems having discontinuous series of numbers.

It is a further object of this invention to provide a method of preparing colour coded filing system index indicators, which method is particularly advantageous when preparing index indicators for systems having discontinuous series of numbers.

The term "filing system index indicators" is meant to include envelopes, filing guides, file pockets, filing folders and binders; all of which are index indicators, and all of which either contain or confine documents, etc. relating to any specific subject matter when used in any filing system.

It is a basic requirement of any filing system that letters, documents, memoranda, or other particulars relating to any particular subject should be easily filed and easily retrieved. When a limited number of subjects and papers are being dealt with, such as personal papers, one may need nothing more than a desk drawer or a series of pigeon-holes. However, most business concerns or other large organizations are required to deal with a considerable number of documents pertaining to large numbers of individual subject matters. In particular, such organizations as insurance companies, hospitals, and police may be required to deal with documents pertaining to a very large number of individual persons, accounts, or policies.

It is normal, when setting up and maintaining a filing system pertaining to large numbers of subject matter, that a separate number is assigned to each file pertinent to a particular subject matter or individual. The simplicity of using number systems rather than systems involving names and initials becomes evident when one realizes that even in small groups, two or more persons may exist having identical names. However, if numbers are assigned to these persons, then data pertaining to each individual may be readily filed with other data pertaining to that individual and not with data pertaining to another person.

It becomes evident, also, when an organization such as a hospital is dealing with a large number of individuals, that while the number of individuals being dealt with may remain essentially constant, the identity of the individuals is constantly changing. It is also evident that when files are being kept on each one of the individuals being dealt with, such files may be on call from perhaps more than one department; and that such files when not on call should be kept in a central storage area in such a manner that they may be easily and correctly filed and may be easily and speedily retrieved.

When maintaining large filing systems, it is common to assign a number to each individual file having at least five digits, and usually six or seven digits. Looking, for example, at a filing system in which each file number has six digits, the numbers of those files may, therefore, run from 100,000 to 999,999. It becomes apparent that, even if 20% or fewer of the numbers contained in the six digit series are used, there are good chances of misfiling or misplacing any particular file. The present invention assists in overcoming the chances of misplaced files.

There are three basic methods in which numerical filing systems may be kept: These are straight numerical filing; middle digit filing; and terminal digit filing. In straight numerical filing, the files are maintained in their ordinary numerical order. In each of the other two filing systems, the files are grouped into a number of sub-groups, and each of the sub-groups is dependent upon a group of digits incident in a file number, but not comprising the complete file number. As the names indicate, middle digit filing requires the grouping of files into sub-groups dependent upon the middle digits appearing in each file number; while terminal digit filing requires the grouping of files into sub-groups dependent upon the terminal digits appearing in each file number.

The obvious advantage of filing by middle digit or terminal digit is that in a group of, say, 100,000 files, the group may be divided into a thousand sub-groups of one hundred files each, or one hundred sub-groups of one thousand files each. As the possibility of misfiling by transposition of digits is lessened when the digits are separated, the search for a misfile can be restricted to a group of 100 or 1,000 files, rather than the full 100,000 files.

The advantages of breaking file numbers into groups of digits become obvious for such large organizations as insurance companies, hospitals, and police. For example, insurance companies may assign a series of files, each having a common group of digits, to such various groups of policies as accident, sickness, health, life, etc. Hospitals may assign series of numbers each having common groups of digits to such file groups as maternity, surgical, isolation, etc.; while police may assign series of numbers each having common groups of digits, to such file groups as type of infraction, geographical location, makes of automobiles, etc.

It becomes apparent from the above that any particular filing system may have many groups of file numbers, each group being continuous or nearly so within the group, but the groups being discontinuous, one from the other. It is also apparent that some groups may have many file numbers in the group, while others may have very few.

In any particular filing system, one way in which file numbers may be made distinctive, and misfiles are readily apparent, is by colour coding the file index indicators. That is, each numeral from "0" to "9," or in some cases a group of numerals, is assigned a distinctive colour: preferably the assigned colours are mutually distinctive. One such set of colours is discussed hereafter. Colour coded filing systems are usually prepared in such a manner that the colours appear on the tab of a file folder or otherwise, as may be indicated by the nature of the index indicator being coded, and the manner in which the files are to be stored. Usually the file index indicators are prepared in such a manner that the colours can be readily viewed when looking at a group of files. Colour coded filing systems are often placed in storage in lateral filing, so that each file extends laterally across a supporting shelf. In this way, each file index indicator is usually prepared so that its colours appear on a portion of the index indicator such that when a shelf of laterally placed colour coded files is viewed, the colours of each of the files are seen at a glance.

By using colour coding, the chances of misfiling a particular file are considerably lessened; or conversely, the chances of finding a misplaced file are greater. For example, if each of the files in a particular group has a light blue colour in a particular field of its coloured indicia, but one of the files has orange in that particular field, then obviously the latter file is misplaced.

Middle digit filing and terminal digit filing provide ways by which groups of files may be made having an index term common to all files in the group. However, it will become obvious that with the teachings of this invention, and by colour coding at least two digits in a number and preferably from four to six digits; that straight numerical filing systems may be set up having groups of continuous numbers, which groups are themselves discontinuous one from another. In other words, for any filing system having preferably four to six digits in each number to be assigned to any file, a numerical filing system may be set up having continuous and discontinuous series of numbers, but requiring that only as many index indicators for that filing system need be printed as there are files to be placed.

In general terms, this invention provides a method of preparing index indicators suitable for use in filing systems in which each such index indicator has been premarked with marks representative of the indicia to be printed, comprising the steps of: sorting out all index indicators requiring a first indicium printed in a first field and printing those index indicators; sorting out all index indicators requiring a second indicium printed in said first field and printing those index indicators; and repeating said sorting out and printing operations until all index indicators are printed with all the required indicia in said first field; re-sorting the index indicators and sorting out all index indicators requiring a first indicium printed in a second field and printing those index indicators; sorting out all index indicators requiring a second indicium printed in said second field and printng those index indicators; and repeating said re-sorting, sorting out and printing operations until all index indicators are printed with all the required indicia in all the requisite fields on each of said index indicators.

More particularly, the invention provides a method of preparing filing systems index indicators such as filing folders, binders, envelopes, filing guides and file pockets, or cards to be applied to index indicators, which are colour coded according to any filing system, and which may have discontinuous series of numbers. Thus, the invention provides a method of preparing colour coded index indicators, or index cards for colour coded index indicators, by sorting out all of the index indicators or cards which require a particular colour indicative of a particular digit in a particular position, and printing all of those index indicators or cards at one time, and by repeating the sorting and printing until each index indicator or card is completely printed.

After each position on the index indicator or card is printed with the required colour and number, all of the index indicators or cards are then re-sorted with respect to the requirements of colour and number of the next position to be printed. In this way, discontinuous series may be printed, since in each printing operation, only those index indicators or cards requiring the particular number and colour in the specific location are passed through the printing press, all others being left aside.

In practice, one sorting operation can be made for each position to be printed; with as many stacks of index indicators or cards after each sorting operation as there are different indicia, such as numbers and their colours, to be printed in separate runs on that position.

The method of preparing colour coded filing system index indicators or cards according to this invention lends itself particularly to the use of high speed sorting apparatus. It is most particularly useful when printing sheets of suitable quality stock, such as cards or other paper forms which will later be applied to filing system index indicators. The sheets or cards are printed and intended for sorting by punched card. Magnetic Ink Character Recognition, optical character recognition, or edge groove sorting apparatus. Punched cards and magnetic ink encoded sheets are particularly suited for high speed sorting.

Once all of the cards or sheets required have been completely printed in accordance with this invention, they may then be re-sorted or not as required, cut and applied to the index indicators.

The invention will be discussed in detail with reference to the drawings, which illustrate various steps and embodiments relating to a single file number, and in which:

FIGURES 1, 2, 3, 4, 5, 6, and 7 illustrate a punched card after various steps in the method of preparation of a colour coded card according to this invention;

Each of FIGURES 1 to 7 illustrates a card being prepared for application to an index indicator, which card bears the file number 372169. FIGURES 8, 9, 10, and 11 illustrate an index indicator, and different sheets for the preparation of an index indicator, all of which bear the same file number. For purposes of this discussion, and of the particular example chosen, the file number may be read 37–21–69.

When preparing colour coded cards which are to be applied to index indicators, or the index indicators themselves, a list of each of the numbers required to be printed is made. These may be numbers assigned to a filing system which exists, but for which new index indicators are being prepared; or they may be numbers for a proposed filing system; or they may be numbers of existing index indicators which havee becomee mutilated and which are to be replaced; or any combination of the above. It will become apparent that the numbers which are required to be printed need not be sequential, and that a discontinuous series may be easily and economically prepared. The advantage of the method of preparation of colour coded cards and index indicators according to this invention when preparing discontinuous series of numbers will become readily apparent.

Figures 9, 10:
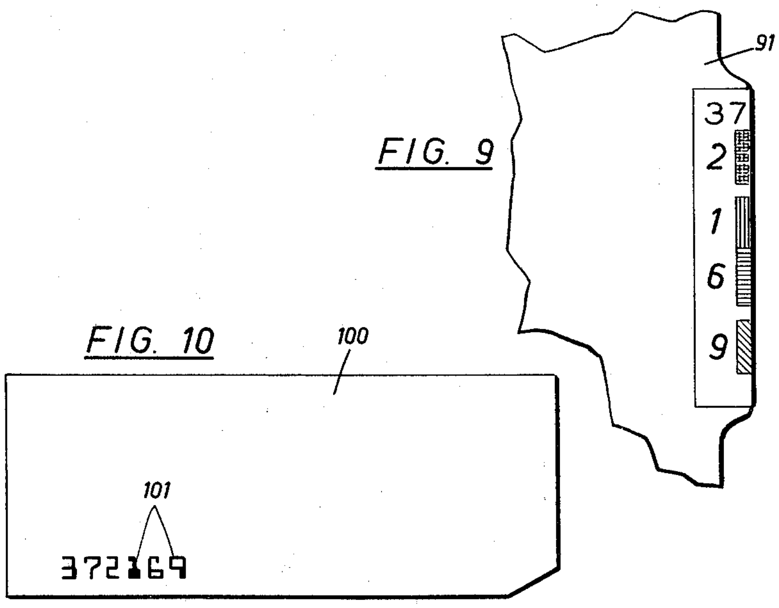
FIGURE 9 illustrates in larger scale a portion of a colour coded index indicator for filing systems.
FIGURE 10 illustrates another embodiment of the card from which a colour coded card may be prepared; and, FIGURE 11 is still another embodiment of a card from which a colour coded card may be prepared.
Figure 11:
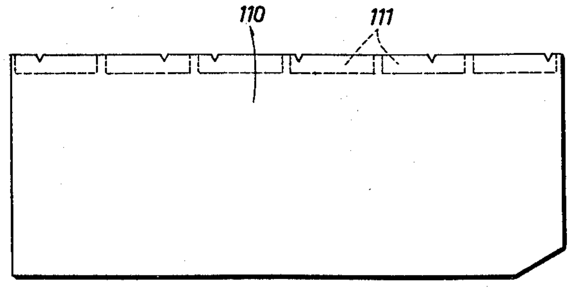

In the usual embodiment in which cards will be prepared for application to index indicators, the original list of the numbers required to be printed is prepared and transferred from such storage means as a master deck of cards or a master tape on a computer to the cards on which the printing will take place. In the most usual embodiment, these cards will be punched cards which are prepared by any of the usual card punching apparatus. It is this most usual embodiment which is illustrated in FIGURES 1 to 7. The cards may also be prepared by printing characters in magnetic ink on suitable stock, and sorting the cards using Magnetic Ink Character Recognition equipment. An example of such a card showing MICR figures 101 printed on card 100 is illustrated in FIGURE 10. The card of FIGURE 10 may also be prepared with MICR (EBB) characters or other character types which may be recognized by, and are operable upon, optical character recognition devices. Yet another manner in which the cards may be prepared is to edge groove the cards in fields along the edge of a card such as fields 111 on card 110 in FIGURE 11.

Figures 1, 2, 3, 4, 5, 6:
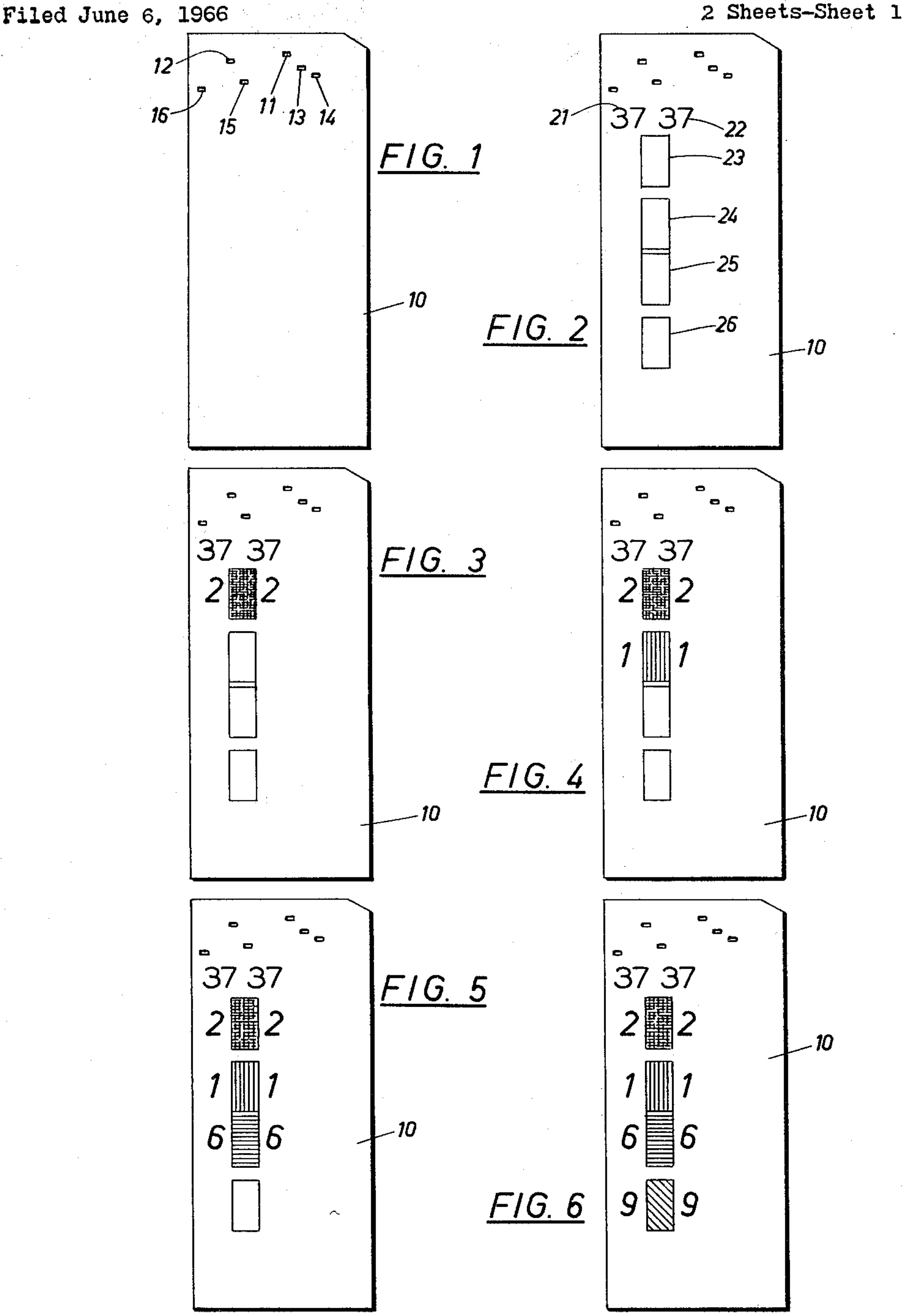

In the example chosen, the number being 37–21–69, the card 10 in FIGURE 1 is punched in the required locations with holes 11, 12, 13, 14, 15, and 16. Hole 11 is in the 3's row, hole 12 is in the 7's row, hole 13 is in the 2's row, and so on. The completed punched card 10 with the digits 3, 7, 2, 1, 6, and 9 in the required order is illustrated in FIGURE 1. By way of example, card 10 may be a standard 80 column card with the punching being in columns 3–8.

In the particular format for the cards chosen, card 10 is placed along with all of the other cards prepared for the printing job of which this card comprises one number to be printed. The cards are first sorted into two digit groups, and the first printing made on card 10 appears as shown in FIGURE 2 when the group of cards requiring the two digit number "37" is sorted in and brought up to the printing press for that particular run. As mentioned, the particular format chosen requires that the numerals "37" be printed in two positions 21 and 22 as illustrated in FIGURE 2, together with the outlines of four blank field positions 23, 24, 25, and 26. By way of example, the colour in which the numerals "37" and the outlines of the field positions are printed in a single pass through the printing press may be black.

Once card 10 has been printed as shown in FIGURE 2, it is then returned with all of the other cards. When all of the cards have been printed in positions 21 and 22, they are then re-sorted; and all of the cards which require a "2" to be printed together with its colour in field position 23 as illustrated in FIGURE 3 are sorted out and grouped together. All of those cards requiring a "2" in that position, including card 10, are then printed, and card 10 then appears as illustrated in FIGURE 3.

Card 10 next appears at the printing press for printing a "1" in field position 24 as illustrated in FIGURE 4, together with all of the other cards requiring the "1" and its colour printed in the identical position. In like manner the card is re-sorted two more times and is printed together with all other cards requiring a "6" and its colour in the field position 25 as illustrated in FIGURE 5; and together with all other cards requiring a "9" and its colour in field position 26 as illustrated in FIGURE 6.

It thus becomes apparent that the completed card illustrated in FIGURE 6 is entirely unique, as is each other card of all of the cards printed for this particular job when each of the cards has been completely printed.

Figure 7:
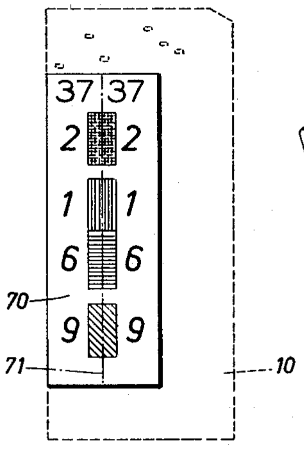

FIGURE 7 illustrates an index card 70 which is cut from the card 10 indicated in phantom outline. A crease 71 may be provided down the centre of index card 70 to assist in the application of the index card to a file folder; which may be such as index indicator 91 illustrated in FIGURE 9. The crease 71 also prevents breaking the ink in field positions 23 to 26 as the card is being folded for application to an index indicator as illustrated in FIGURE 9.

Index indicator 91 of FIGURE 9 may also be a binder, envelope, file pocket or filing guide, only a portion of which is shown. It is obvious that the prepared card of FIGURE 7 may be applied to any index indicator in an area for bearing indicia suitable for filing purposes.

As mentioned above, colour coded filing systems are practicable most particularly in lateral filing. In a storage system utilizing lateral filing, the folders or other file index indicators are placed on their sides in open shelves, so that the ends of each of them may be viewed at a glance. The obvious advantage of lateral filing over drawer filing is that all of the files on a particular shelf may be viewed at one time; whereas when they are in a drawer, the drawer must be pulled out of the cabinet in order to view all of the files therein. This is particularly important when searching for misplaced files. In addition, lateral filing lends itself more readily to such filing systems as middle digit filing or terminal digit filing, as discussed above. Again, a misplaced file is more easily spotted using such a filing system when laterally filed. In addition, if a file is filed out of sequence in the correct grouping, the search for that file can be restricted to the group, thereby reducing the area for searching by a factor of ten or one hundred or more.

Figure 8:
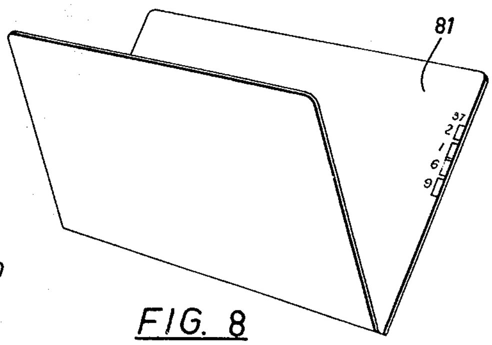
FIGURE 8 illustrates a filing folder on which the printing has been made directly.

It is apparent that the colour coded index cards of this invention need not necessarily be separately printed before being placed on index indicators. The index indicators may, themselves, be printed with the requisite colour coded indicia and may be sorted in the same manner as discussed above. However, it is obvious that printing and sorting equipment suitable for handling the index indicators must be available. FIGURE 8 illustrates a filing folder 81 on which the indicia have been directly printed in accordance with this invention.

It will also be apparent that the sorting steps in the preparation of index cards or index indicators need not necessarily be made on high speed automatic sorting equipment; but rather, some or all of the sorting steps may be made manually. This is particularly evident when a small run is being made, such as during the preparation of replacement index indicators for an existing system. In addition, when large batches of cards are being printed, say with six figures as in the example, and a considerable quantity of the cards require one of two or three indicia in a particular field, these cards may be sorted out by hand. For example, if a series of cards is being prepared bearing a nearly consecutive number series from 120,000 to 139,999, it is apparent that all cards will need a "1" in the highest order position; and that half of the cards will require a "2," while the other half a "3," in the second highest order position If the cards are properly prepared the first three runs through the printing machines may be made without the need of sorting equipment.

Also, if duplicate series of consecutive numbers are required, these may be prepared in such a manner described as follows. A quantity of sheets is prepared, one for each number of the series. Each sheet is large enough to carry as many sets of numbers as are required for the duplicate sets. The sheets may then be broken into ten stacks and one each of the digits "0" to "9" printed in the high order position. The stacks are then laid out and either manually or mechanically collated into new stacks by taking one sheet from each stack in sequence. The new stacks are then printed with one of each of the digits "0" to "9" in the second highest order position. By properly stacking and collating, a run may then be prepared for each of the subsequent positions to be printed, resulting in duplicate sets of consecutively numbered colour coded indicia. Individual index cards may then be separated by guillotine or other cutting process for application to index indicators. It may be seen that this method, while generally the same as described above, is useful only for consecutively numbered systems. In addition, the system is practicable only for preparation of relatively small batches of cards, say up to ten thousand.

As indicated above, when a colour coded filing system is prepared, each of the digits from "0" to "9" is assigned a distinctive colour; and preferably the assigned colours are mutually distinctive. When such colours are assigned, it becomes apparent that one colour cannot be mistaken for any other colour. It is also advisable that the colours should be in a sequence or order which makes them easy to remember. In addition, if the colours chosen are sufficiently mutually distinctive, they may be printed in a small field area on the colour coded cards or index indicators without loss or distinction, and without creating the likelihood of confusion. One such colour system which has been found particularly adaptable is as follows.

TABLE 1

| Digit: | Assigned colour |
|---|---|
| 0 | Light red. |
| 1 | Dark red. |
| 2 | Light orange. |
| 3 | Dark orange. |
| 4 | Light green. |
| 5 | Dark green. |
| 6 | Light blue. |
| 7 | Dark magenta. |
| 8 | Light magenta |
| 9 | Dark brown. |

From the above table, it becomes apparent that each of the even numbers is assigned a light colour; and that each of the odd numbers is assigned a dark colour. In addition, the sequence red-orange-green-blue-magenta-brown is one that may be easily remembered as it approximates a prismatic colour sequence. It will be noted that dark blue is not assigned as a representative colour for a digit, because it is not completely distinctive from dark magenta or from black.

It will be apparent that many alterations may be made to the colour coded cards or index indicators prepared according to this invention. Most particularly, the choice of format of the card or index indicator, the number of colour coded field to be prepared for each card or index indicator and the colours chosen may be dictated by such considerations as the size of the fiiling system, economy, and discontinuities within the system. However, it will be readily apparent that colour coded cards or index indicators may be prepared by sorting and printing processes according to this invention without departing from the spirit or scope of the appended claims.

The embodiments of the invention in which an exclusive property or privilege is claimed are defined as follows:

1. A method of preparing index indicators suitable for use in filing systems in which each such index indicator has been pre-marked with marks representative of the indicia to be printed, comprising the steps of: sorting out all index indicators requiring a first indicium printed in a first field and printing those index indicators; sorting out all index indicators requiring a second indicium printed in said first field and printing those index indicators; and repeating said sorting out and printing operations until all index indicators are printed with all the required indicia in said first field; re-sorting the index indicators and sorting out all index indicators requiring a first indicium printed in a second field and printing those index indicators; sorting out all index indicators requiring a second indicium printed in said second field and printing those index indicators; and repeating said re-sorting, sorting out and printing operations until all index indicators are printed with all the required indicia in all the requisite fields on each of said index indicators; wherein all said sorting out and re-sorting operations of said method are carried out with reference to the pre-marked marks representative of the indicia to be printed.

2. A method of preparing index indicators suitable for use in filing systems in which each such index indicator has been pre-marked with marks representative of the indicia to be printed, comprising the steps of: sorting out all index indicators requiring a first indicium printed in a first field and printing those index indicators; sorting out all index indicators requiring a second indicium printed in said first field and printing those index indicators; and repeating said sorting out and printing operations until all index indicators are printed with all the required indicia in said first field; re-sorting the index indicators and sorting out all index indicators requiring a first indicium printed in a second field and printing those index indicators; sorting out all index indicators requiring a second indicium printed in said second field and printing those index indicators; and repeating said re-sorting, sorting out and printing operations until all index indicators are printed with all the required indicia in all the requisite fields on each of said index indicators; wherein all said sorting out and re-sorting operations are carried out using automatic sorting equipment, which equipment recognizes the pre-marked marks representative of the indicia to be printed and is operative according to said marks.

3. The method of claim 2 wherein all said sorting out operations for said first field are carried out before said first indicium and subsequent indicia are printed in separate printing operations in said first field; and all said sorting out operations for said second field and the subsequent fields are carried out before said first and subsequent indicia are printed in said second or subsequent fields in separate printing operations.

4. A method of preparing index indicators suitable for use in filing systems, each of said index indicators having an area thereon for bearing indicia for filing purposes comprising the steps of: providing separate sheets of suitable quality stock, one for each index indicator to be prepared, and each of which sheets is pre-marked with marks representative of the indicia to be printed; sorting out all sheets requiring a first indicium printed in a first field and printing those sheets; sorting out all sheets requiring a second indicium printed in said first field and printing those sheets; and repeating said sorting out and printing operations until all sheets are printed with all the required indicia in said first field; re-sorting the sheets and sorting out all sheets requiring a first indicium printed in a second field and printing those sheets; sorting out all sheets requiring a second indicium printed in said second field and printing those sheets; and repeating said re-sorting, sorting out and printing operations until all sheets are printed with all the required indicia in all the requisite fields on each of said sheets; cutting said sheets, and applying said sheets one to each of said index indicators so that said sheets are applied at said area for bearing indicia on each of said index indicators; and wherein all said sorting out and re-sorting operations of said method are carried out with reference to the pre-marked marks representative of the indicia to be printed.

5. The method of claim 4 wherein said indicia on each index indicator comprise at least two field areas printed in colour and numerical digits printed outside but in association with said colour field areas, one numerical digit from "0" to "9" for each said field areas and printed in the same colour as the field area with which it is associated; and wherein each numerical digit from "0" to "9" is assigned a colour mutually distinctive from the colours assigned to each of the other digits.

6. The method of claim 5 wherein said indicia on each index indicator comprise at least two field areas printed in colour and numerical digits printed outside but in association with said colour field areas, one numerical digit from "0" to "9" for each said field areas and printed in the same colour as the field area with which it is associated; wherein each numerical digit from "0" to "9" is assigned a colour mutually distinctive from the colours assigned to each of the other digits, and wherein said assigned colours to each of said digits from "0" to "9" are as follows:

| Digit: | Assigned colour |
|---|---|
| 0 | Light red. |
| 1 | Dark red. |
| 2 | Light orange. |
| 3 | Dark orange. |
| 4 | Light green. |
| 5 | Dark green. |
| 6 | Light blue. |
| 7 | Dark magenta. |
| 8 | Light magenta. |
| 9 | Dark brown. |

7. A method of preparing index indicators suitable for use in filing systems, each of said index indicators having an area thereon for bearing indicia for filing purposes comprising the steps of: providing separate sheets of suitable quality stock, one for each index indicator to be prepared, and each of which sheets is pre-marked with marks representative of the indicia to be printed; sorting out all sheets requiring a first indicium printed in a first field and printing those sheets; sorting out all sheets requiring a second indicium printed in said first field and printing those sheets; and repeating said sorting out and printing operations until all sheets are printed with all the required indicia in said first field; re-sorting the sheets and sorting out all sheets requiring a first indicium printed in a second field and printing those sheets; sorting out all sheets requiring a second indicium printed in said second field and printing those sheets; and repeating said re-sorting, sorting out and printing operations until all sheets are printed with all the required indicia in all the requisite fields on each of said sheets; cutting said sheets, and applying said sheets one to each of said index indicators so that said sheets are applied at said area for bearing indicia on each of said index indicators; and wherein said sorting out and re-sorting operations are carried out using automatic sorting equipment which equipment recognizes the pre-marked marks representative of the indicia to be printed and is operative acording to said marks.

8. The method of claim 6 wherein all said sorting out operations for said first field are carried out before said first indicium and subsequent indicia are printed in separate printing operations in said first field; and all said sorting out operations for said second field and the subsequent fields are carried out before said first and subsequent indicia are printed in said second or subsequent fields in separate printing operations.

9. The method of claim 6 wherein all said sorting out operations for said first field are carried out before said first indicium and subsequent indicia are printed in separate printing operations in said first field; and all said sorting out operations for said second field and the subsequent fields are carried out before said first and subsequent indicia are printed in said second or subsequent fields in separate printing operations; and wherein said sorting out operations are carried out using automatic sorting equipment, which equipment recognizes said marks and is operative according to said marks; said automatic sorting equipment being chosen from the group comprising punched card sorters, magnetic ink character recognition sorters, optical character recognition sorters, and edge groove sorters.

References Cited

UNITED STATES PATENTS 3,421,752 1/1969 Folino ............... 270—1
3,191,767 6/1965 Glowiak ........ 129—16.5 X EUGENE R. CAPOZIO, Primary Examiner P. V. WILLIAMS, Assistant Examiner U.S. Cl. X.R.

270—58

UNITED STATES PATENT OFFICE

CERTIFICATE OF CORRECTION

Patent No. 3,504,907 April 7, 1970

Donald Treadgold Barber et al.

It is certified that error appears in the above identified patent and that said Letters Patent are hereby corrected as shown below:

Column 8, line 52, claim reference numeral "5" should read -- 4 --. Column 9, line 28 and Column 10, line 5, claim reference numeral "6", each occurrence, should read -- 7 --.

Signed and sealed this 19th day of January 1971.

(SEAL)
Attest:

Edward M. Fletcher, Jr.
Attesting Officer

WILLIAM E. SCHUYLER, JR.
Commissioner of Patents